J. MONTGOMERY.
WATER ELEVATOR.
APPLICATION FILED MAR. 16, 1908.
938,266.
Patented Oct. 26, 1909.
3 SHEETS—SHEET 3.
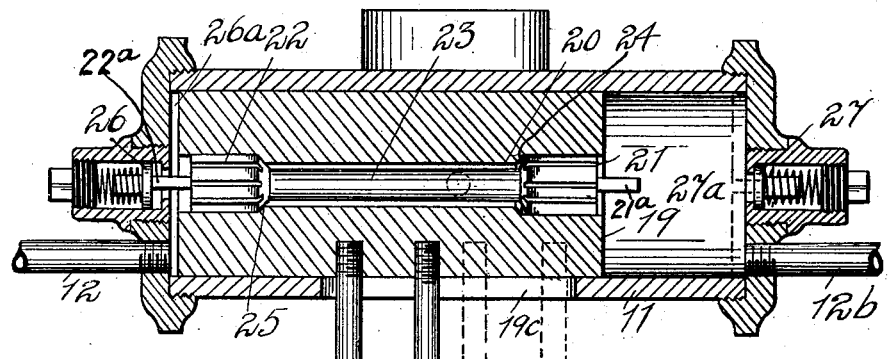
Fig. 8.
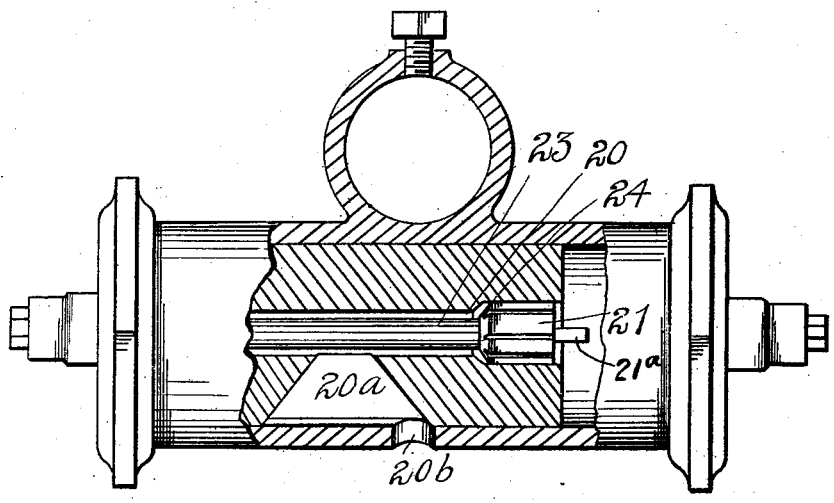
Fig. 9.
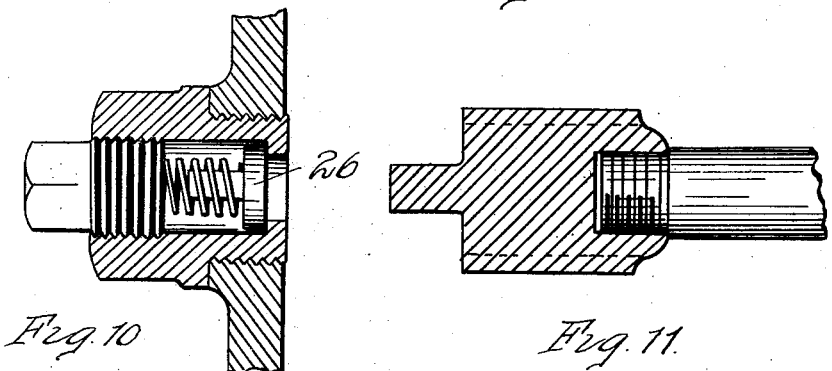
Fig. 10.
Fig. 11.
Witnesses
Clarence E. Day
Alecia Townsend
Inventor
John Montgomery
Parker & Burton
Attorneys

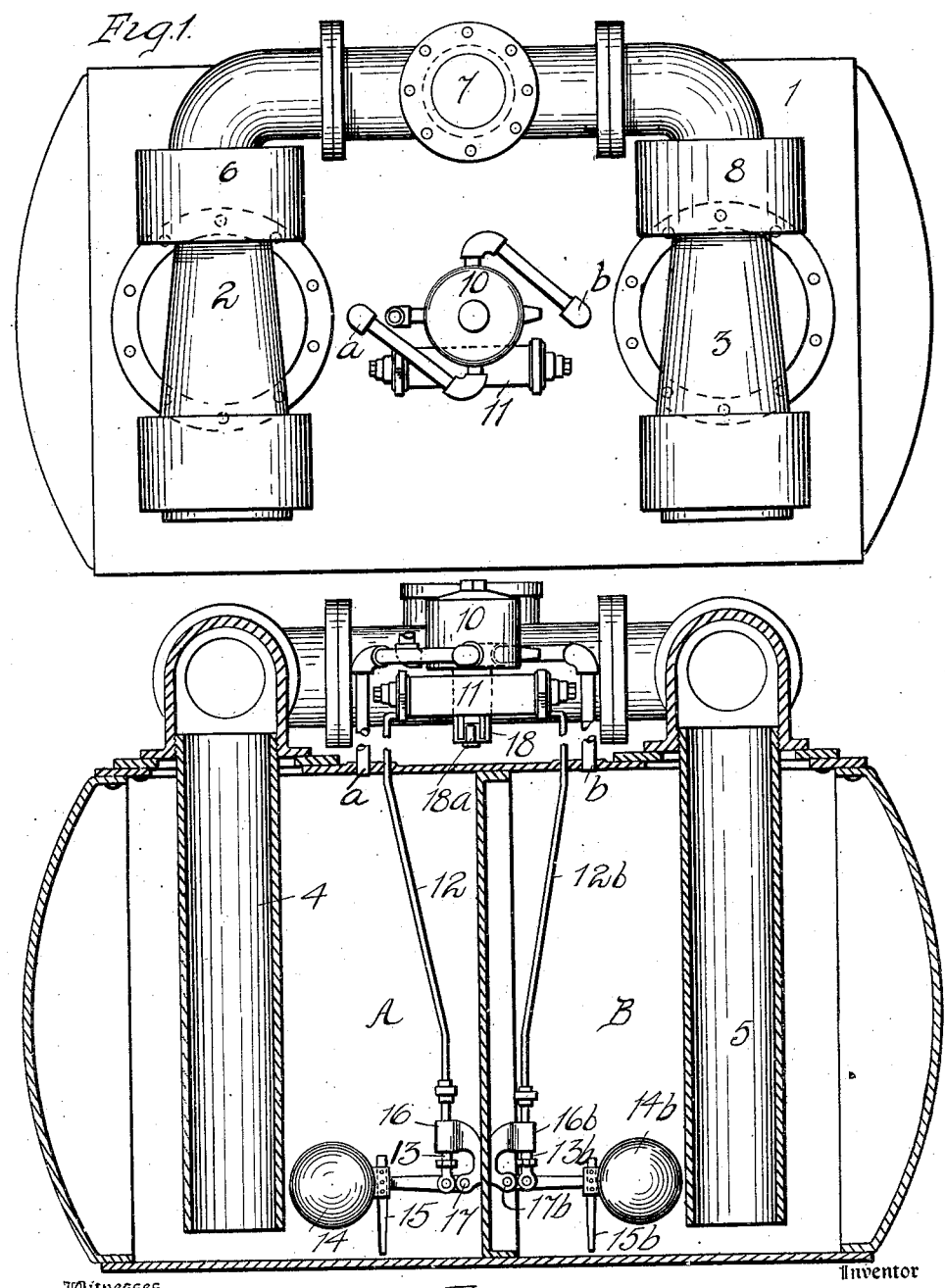

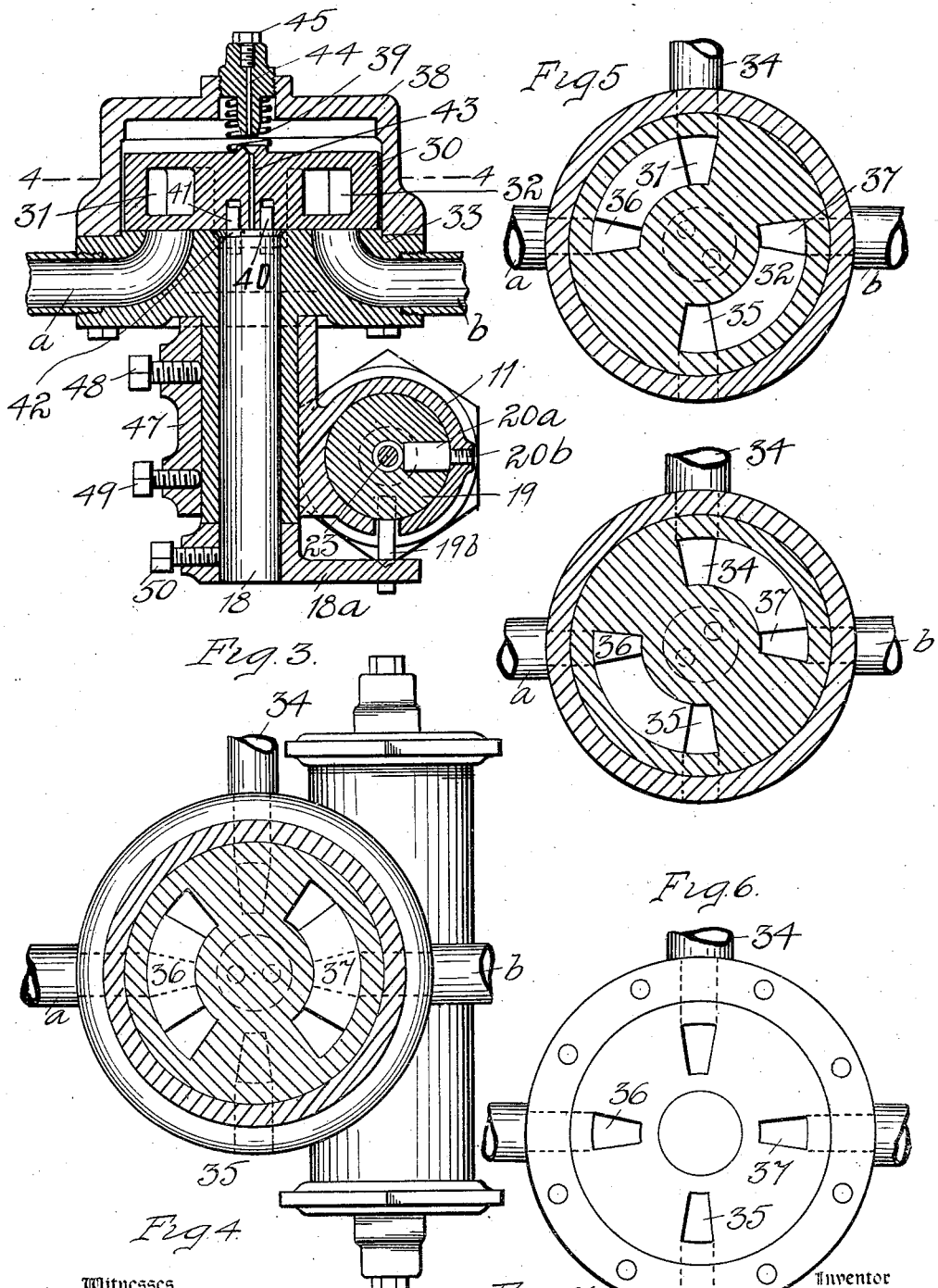

UNITED STATES PATENT OFFICE.

JOHN MONTGOMERY, OF TORONTO, ONTARIO, CANADA.

WATER-ELEVATOR.

938,266.  Specification of Letters Patent.  Patented Oct. 26, 1909.

Application filed March 16, 1908. Serial No. 421,400.

*To all whom it may concern:*

Be it known that I, JOHN MONTGOMERY, a subject of the King of Great Britain, residing at Toronto, county of York, Province of Ontario, Canada, have invented a certain new and useful Improvement in Water-Elevators, and declare the following to be a full, clear, and exact description of the same, such as will enable others skilled in the art to which it pertains to make and use the same, reference being had to the accompanying drawings, which form a part of this specification.

This invention relates to water elevators.

It has for its object an improved elevator in which the water is forced from a submerged tank to its place of use by compressed air that is admitted to the submerged tank, and forces the water alternately from each of two chambers that are contained in the tank.

The particular improvements which form the object of this invention relate to means by which the air pressure is transferred automatically from one chamber to the other, and the discharge of water at the delivery part of the apparatus is practically constant so long as the air pressure is maintained.

The means for compressing air, or temporarily holding compressed air, form no part of the invention, and the drawings show only the tank and the parts immediately connected with it by means of which the air is shifted from one chamber to the other.

The air shifting valve in actual construction is located at some distance from the tank, where it will not be subjected to the action of moisture, or at least where it will not be submerged. In the drawings it is shown as in close relation to the tank, although the connecting pipes are shown as broken off; mechanically it has this relation, though the intervening distance may be considerable.

In the drawings:—Figure 1, is a plan view of the tank. Fig. 2, is a vertical longitudinal section through the tank, and an elevation of the air shifting valve. Fig. 3, is a vertical section through the valve. Fig. 4, is a horizontal section at the line 4—4 of Fig. 3, with the rotary part of the valve shown in neutral position. Fig. 5, is a section at the same place, with the rotary part of the valve shifted to conduct the air into the pipe $a$, and to discharge air from the pipe $b$. Fig. 6, shows the same parts with the valve oscillated to discharge air from the pipe $a$ and conduct air into the pipe $b$. Fig. 7, is a plan of the valve seat. Fig. 8, is a vertical longitudinal section through the piston engine, which shifts the valve. Fig. 9, is a horizontal longitudinal section through the piston which shifts the valve. The main object of Fig. 9 is to show the discharge outlet of this engine. Fig. 10, is a detail of the cushioning spring at the end of the piston engine. Fig. 11, is a detail of the end of the shifting member of the engine.

A tank 1 divided into two chambers A and B is made of a capacity to produce the desired flow, and is arranged to be submerged in the body of water from which some part is to be lifted. The chambers A and B are filled through inlet pipes 2 and 3, each of which is provided with a check valve that closes to prevent the outflow through this pipe of water that has once entered the tank. From the pipe 2 a depending pipe 4 drops nearly to the bottom of the chamber A, and from the pipe 3 a depending pipe 5 drops nearly to the bottom of the chamber B. The entering water passes through these pipes into the chambers, and as the water emerges, it passes through these pipes again; water emerging through the pipe 4 passes a check valve in valve shell 6, and thence into the common delivery pipe 7; water emerging through the pipe 5 passes a check valve in valve shell 8, and thence into the common delivery pipe 7. If water be admitted into the chamber A, and be prevented from escaping by means of the check valve into the inlet pipe, and be subjected to an air pressure directed against it on its upper side, within the chamber A, it will be forced through the delivery pipe 7 to any elevation determined by the force of the compressed air, and this discharge will continue until the water is driven below the end of the pipe 4, or until by some other means the air pressure be relieved. If shortly before the lower end of the pipe 4 is exposed the air pressure be shifted from the chamber A to the chamber B, and the chamber A be given vent so that the air contained in it may escape, the chamber A will again fill by the gravity force of the water in which the tank is submerged, and the air pressure now being exerted on the surface of the water in the chamber B, will force the water from that chamber until the water reaches the bottom of the pipe 5. If just before this happens, the air pressure be again shifted, vent be given to the chamber B, the operation will be repeated, and if the shifting be made automatic, the operation of the elevation of water will be practically continuous, and in fact in large apparatus which I have made delivering water through a four inch pipe at an elevation of one hundred and eighty-five feet, the operation is so nearly continuous that the time of shifting is scarcely observable to one watching the outflow from the end of the delivery pipe. The automatic shifting device for the air pressure is accomplished by means of the air itself, aided by floats that are located in the submerged tank.

The air is admitted into the chamber A through air inlet pipe $a$ from a many-way valve 10, and the air is admitted into the chamber B through a pipe $b$ from the same valve 10. The oscillating part of the valve 10 is shifted by an air engine 11, which is automatically actuated by a portion of the air that escapes from the chamber A or the chamber B. The air which actuates the engine in one direction is admitted into said engine from the chamber through a small pipe 12, which is closed by a plug valve 13 at its lower end, which lower end is located in the chamber A at a height such that it is open shortly before the water level drops to the lower end of the pipe 4, or would drop to the lower end of the pipe 4 but for the opening of this plug valve and the shifting of the valve 10 which follows it. The valve 13 is held against its seat normally by a float 14, which float has a very small range of action, as it is prevented from dropping to a distance greater than sufficient to properly open the passage by a stop leg 15, and is prevented from rising by the engagement of the valve 13 against its seat. The end of the pipe 12 is held rigidly with respect to the walls of the chamber by a bracket 16 secured to the chamber wall, and this bracket 16 not only holds the end of the pipe 12, but has as a part of it, the hinged knuckle 17 of the float stem, to which float stem the stem of the valve 13 is pivotally connected. The air which actuates the engine 11 in the reverse direction and acts to relieve the chamber B from pressure, escapes from the chamber B through a pipe $12^b$, the lower end of which is held by a bracket $16^b$, in fixed relation with a wall of the chamber B. The bracket $16^b$ is provided with a knuckle extension $17^b$, to which is pivotally connected the float arm of the float $14^b$; the valve stem of a valve $13^b$ is pivotally connected to this float arm. The valve $13^b$ seats against a valve seat on the lower end of the pipe $12^b$. The movement of the float $14^b$ is limited in one direction by stop leg $15^b$, and in the other direction by the engagement of the valve $13^b$ against its seat. The air entering the engine 11 through the pipe 12 shifts the piston of the engine, and the shifting of the piston actuates the stem 18, and oscillates the valve which forms part of the valve 10.

The automatically acting engine 11 contains a piston 19, which fills the cylinder chamber, except for an air space, at each end, and the air spaces at the two ends vary as the piston shifts in the cylinder. The main or larger piston 19 is provided with a central passage, at each end of which are enlarged chambers for the reception of the ends 21 and 22 of an auxiliary or pilot piston 23, that has a very short shifting motion with respect to the larger piston. The heads of the piston 23 are valves which close against the seats 24 and 25, that form part of the passage through the larger piston. These seats are located at the places where the larger cavities at the ends contract to the smaller bore through the piston. The main body of the pilot piston 23 is smaller than the bore in which it reciprocates, and the head part beyond the collar that forms the valve proper is provided with fins or feathers, or wings, that engage closely against the walls of the larger bore at the end of the passage, and maintain the pilot piston centrally with respect to the main piston 19. At each end of the pilot piston 23 is a projection $21^a$, $22^a$ adapted to strike against a cushioned plug, one of which is located in each head member of the cylinder. The engagement between the projection and the plug insures the seating of the valve portion of the pilot piston 23 against its seat, and the closure of the passage against air entering the engine at that side of the piston, as for example, referring to Fig. 8, in which the projection $22^a$ from the head 22 has struck the cushioned plug 26, and has forced the valve part against its seat, and thereby prevented the escape of air entering the pipe 12 from the chamber at the end of the piston, and therefore air entering through the pipe 12 under pressure, will force the piston 19, and the piston 23 will travel with it, toward the cushioned plug 27, until the projection from the head 21 shall have engaged the cushioned plug 27, and shifted the piston 23 with respect to the piston 19. During all the period that the piston 19 is moving toward the plug 27, there is a free escape for air from the chamber $27^a$ through the passage 20, and the outlet passage $20^a$ (shown in Fig. 9), and the outlet passage $20^b$ through the walls of the cylinder. When moving in the reverse direction, the air that has entered the chamber $26^a$ has an equally free escape into the passage 20, and through the escape outlets $20^a$ and $20^b$. The main piston 19 is provided with a pair of pins $19^a$ and $19^b$, which project through a slot $19^c$ in the walls of the cylinder, and straddle a crank arm $18^a$ on the stem 18 of the oscillating member of the valve 10.

The oscillating member of the valve 10 controls the admission of air into, and the discharge of air from the two chambers A and B of the tank. The oscillating member is a disk 30 provided with two oppositely located arched chambers 31 and 32, each of which has a length to cover slightly more than a quadrant of arc. This disk rests upon the seat 33 provided with ports 34 and 35 and with ports 36 and 37 that are constantly in connection with the small conductor pipes *a* and *b*. The chambers 31 and 32 are covered and partially bottomed, and the disk 30 is held to its seat by a spring 39 that bears between the oscillating disk 30 and a plug in the cap 38, which cap is secured to the seat member 33. A valve stem 18 extends through the casing 40, which supports the oscillating valve, and has coupling facilities by means of which it is held in proper relation to the remaining parts of the structure. The disk 30 is not made integral with the stem 18, but rests thereon, and is connected to oscillate therewith by means of a pair of pins 40 and 41 that project upward from the stem and enter sockets in the disk. Between the disk and the stem 18 is a very slight cavity 42, and leading into this cavity is a passage 43 concentric with the disk. The passage 43 is open at the upper end; a passage 44 leads through the plug in the cap 38, and is stopped by a screw plug 45 at its upper end. When the valve is in use, or ready for use, the screw plug 45 is removed, and the chamber above the disk 30 filled with oil. The oil fills the thin annular space between the disk and the cap, and some part of it passes through the passage 43, and rests in the small chamber 42, and the entire valve is thus practically floating in oil, which rests on its upper surface and covers the vertical sides of the oscillating part, and lubricates the under engaging faces of the disk and its seat, and the valve thus furnished with oil is adapted to retain its lubrication for a long period of time. It is not used as a valve for the control of water, but of air, and retains its lubrication longer than a similar valve subjected to water action.

The stem 18 is provided with an arm 18$^a$ which projects between the pins 19$^a$ and 19$^b$, and constitutes a crank by which the reciprocation of the piston 19 actuates the oscillating disk valve 30. The engine 11 is held to the shell of the valve by a sleeve bracket 47, and set screws 48 and 49. The crank arm 18$^a$ is held to the stem by set screw 50.

In the position shown in Fig. 4, the disk valve is in a neutral position, and no air can travel from the conductor pipe 34 into either of the pipes *a*, *b*. When the disk be oscillated to a position shown in Fig. 5, the air entering through the pipe 34 is conducted through the pipe *a* into the chamber A, and the air escapes from the chamber B through the exhaust 35 into the open air. If the disk be oscillated to the position shown in Fig. 6, then the air from conductor pipe 34 passes through the pipe *b* into the chamber B, and the air which was in the chamber A passes through the pipe *a* to the exhaust 35.

What I claim is:—

1. In a water elevator, in combination with a plurality of tanks provided with passages for the entrance thereinto of water by gravity, a pipe adapted to convey air under pressure into said tanks, a controlling valve adapted to shift the air into either of said tanks, and to simultaneously provide an exhaust outlet from another of said tanks, an air driven valve actuator adapted to shift said controlling valve, said valve actuator being provided with an air driven piston and a pilot valve carried by said piston adapted to control a discharge passage for the air used to drive said piston, substantially as described.

2. In a water elevator, in combination with a plurality of water receiving tanks, means for expelling water from said tanks by air pressure, an automatic shifting device adapted to shift the air from one of said tanks to another and to simultaneously open the exhaust passage, said shifting device comprising an air driven piston and a pilot valve carried by said piston and acting automatically upon movement thereof for discharging the air that has been used to drive said piston, substantially as described.

3. In a water elevator, a water tank, means for expelling water from said tank by air pressure, a valve shifting device operable by the air escaping from the tank, said shifting device comprising an air driven piston, a valve carried thereby and acting automatically upon movement of the piston for discharging the air that has been used to drive said piston, and a float actuated valve controlling the admission of air to the piston.

4. In a water elevator, a pair of water receiving tanks, means for expelling water from said tanks by air pressure, an automatic shifting device adapted to shift the air from one of said tanks to another and to simultaneously open the exhaut passage, said shifting device comprising a cylinder, a piston therein having a passage extending therethrough, means for alternately closing the ends of said passage upon movement of said piston, and air passages extending from the tanks to the ends of the cylinder.

5. In a water elevator, a pair of water receiving tanks, means for expelling water from said tanks by air pressure, an automatic shifting device adapted to transfer the air from one of said tanks to the other comprising a cylinder, a piston therein having a passage extending therethrough, means for alternately closing the ends of said passage upon movement of said piston, an exhaust passage communicating with the passage extending through the piston, and air passages extending from the tanks to the ends of the cylinder.

6. In a water elevator, a pair of water tanks, means for expelling water from said tanks by air pressure, an automatic shifting device adapted to shift the air from one of said tanks to the other comprising a cylinder, a piston therein provided with a passage extending therethrough, said passage having therein oppositely disposed valve seats, a longitudinally movable valve stem arranged within said passage and projecting beyond the ends of the piston, valves carried by said valve stem adapted to coöperate with said valve seats, and air passages extending from the tanks to the ends of the cylinder.

7. In a water elevator, a pair of water tanks, means for expelling water from said tanks by air pressure, an automatic shifting device adapted to transfer air from one tank to another comprising a cylinder, air pipes extending from the tanks to the ends of the cylinder, a piston working in said cylinder and provided with a passage therethrough having valve seats adjacent the ends thereof, a longitudinally movable valve stem positioned in said passage and projecting beyond the ends of the piston, valves carried by said valve stem and adapted to coöperate with said valve seats, and an exhaust passage communicating with the passage in the piston intermediate the valve seats.

In testimony whereof I sign this specification in the presence of two witnesses.

JOHN MONTGOMERY.

Witnesses:
  EDITH M. REID,
  MARY McPHEE.